United States Patent
Carlston

(10) Patent No.: US 8,221,109 B2
(45) Date of Patent: Jul. 17, 2012

(54) MATERIAL LAYERING DEVICE

(75) Inventor: Marvin Carlston, Lehi, UT (US)

(73) Assignee: Gold Tip, LLC, Orem, UT (US)

( * ) Notice: Subject to any disclaimer, the term of this patent is extended or adjusted under 35 U.S.C. 154(b) by 687 days.

(21) Appl. No.: 11/951,174

(22) Filed: Dec. 5, 2007

(65) Prior Publication Data

US 2008/0128940 A1  Jun. 5, 2008

Related U.S. Application Data

(60) Provisional application No. 60/868,645, filed on Dec. 5, 2006.

(51) Int. Cl.
*B30B 5/04* (2006.01)

(52) U.S. Cl. ........ 425/373; 425/115; 425/193; 425/329; 425/335; 425/367; 264/165; 264/172.19; 264/280

(58) Field of Classification Search ........... 425/101, 425/115, 193, 224, 297, 329, 335, 356, 362, 425/363, 364 R, 365, 367, 368, 371, 373, 425/374; 264/165, 171.24, 171.27, 172.19, 264/173.1, 210.2, 210.6, 211.12, 280, 284, 264/DIG. 75; 156/62.8, 242, 290, 298, 349, 156/358, 555, 580, 581, 582, 583.5
See application file for complete search history.

(56) References Cited

U.S. PATENT DOCUMENTS

| | | | |
|---|---|---|---|
| 32,993 A | 8/1861 | Heald | |
| 237,117 A | 2/1881 | Mann | |
| 244,559 A | 7/1881 | Crowell | |
| 481,453 A | 8/1892 | Winget | |
| 522,197 A | 7/1894 | Crowell | |
| 657,028 A | 8/1900 | Pace | |
| 724,485 A | 4/1903 | Miles | |
| 775,538 A | 11/1904 | McConnell | |
| 1,043,108 A | 11/1912 | Hughes | |
| 1,057,193 A | 3/1913 | Wertheimer | |
| 1,070,818 A | 8/1913 | Lacroix | |
| 1,393,768 A | 10/1921 | Feifer | |
| 1,619,615 A | 3/1927 | Heinrichs | |
| 2,694,661 A | 11/1954 | Meyer | |
| 2,782,461 A * | 2/1957 | Esslinger | 264/284 |
| 2,891,279 A * | 6/1959 | Neumann | 156/282 |
| 2,931,063 A * | 4/1960 | Harris | 264/45.9 |
| 2,971,218 A * | 2/1961 | Bierer | 264/280 |
| 3,078,510 A * | 2/1963 | Rowe | 264/112 |
| 3,165,783 A * | 1/1965 | Martelli | 425/384 |
| 3,241,182 A * | 3/1966 | Kessler | 425/327 |
| 3,246,365 A * | 4/1966 | Kloender | 425/367 |

(Continued)

*Primary Examiner* — Joseph Del Sole
*Assistant Examiner* — Seyed Masoud Malekzadeh
(74) *Attorney, Agent, or Firm* — TraskBritt

(57) ABSTRACT

A material layering device. A material layering device may include a first pinning roller and a second pinning roller. The distance between the first pinning roller and the second pinning roller is less than a diameter of an substrate. The device also includes a return system, wherein the return system comprises a plurality of rollers. The device also includes a belt, which may have a first loop portion disposed between and protruding beyond the first pinning roller and the second pinning roller. The first loop portion also wraps about an intended substrate along an arc greater than about 180 degrees. The device further includes a feed portion coupled to the first loop and extending outwardly from the second pinning roller opposite the first loop and providing a surface upon which a sheet can be placed. Furthermore, the device also includes an adjustment mechanism coupled to one of the rollers.

20 Claims, 5 Drawing Sheets

U.S. PATENT DOCUMENTS

| | | | | |
|---|---|---|---|---|
| 3,737,351 A * | 6/1973 | Ettel | | 156/62.2 |
| 3,782,875 A * | 1/1974 | Olschewski | | 425/223 |
| 3,799,052 A * | 3/1974 | Kusters et al. | | 100/313 |
| 3,874,962 A * | 4/1975 | Gersbeck et al. | | 156/62.2 |
| 3,887,314 A * | 6/1975 | Andresen et al. | | 425/135 |
| 3,891,376 A * | 6/1975 | Gersbeck et al. | | 425/373 |
| 3,915,612 A * | 10/1975 | Gersbeck et al. | | 425/373 |
| 3,921,317 A * | 11/1975 | Kolb | | 38/49 |
| 3,932,258 A * | 1/1976 | Brinkman et al. | | 156/498 |
| 3,938,927 A * | 2/1976 | Brinkmann et al. | | 425/373 |
| 3,942,927 A * | 3/1976 | De Mets | | 425/135 |
| 3,973,894 A * | 8/1976 | Lindner et al. | | 425/370 |
| 4,012,188 A * | 3/1977 | Lemelson | | 425/373 |
| 4,045,262 A * | 8/1977 | Enzinger et al. | | 156/62.2 |
| 4,064,929 A * | 12/1977 | Quehen et al. | | 164/433 |
| 4,172,490 A * | 10/1979 | Ware | | 164/433 |
| 4,178,147 A * | 12/1979 | Hayashi | | 425/372 |
| 4,192,636 A * | 3/1980 | Hayashi et al. | | 425/96 |
| 4,349,575 A * | 9/1982 | Roth | | 426/513 |
| 4,359,827 A * | 11/1982 | Thomas | | 34/452 |
| 4,359,828 A * | 11/1982 | Thomas | | 34/114 |
| 4,457,683 A * | 7/1984 | Gerhardt et al. | | 425/373 |
| 4,489,949 A | 12/1984 | Taylor et al. | | |
| 4,543,225 A * | 9/1985 | Beaujean | | 264/167 |
| 4,631,017 A * | 12/1986 | Hayashi | | 425/335 |
| 4,692,110 A * | 9/1987 | Hayashi | | 425/335 |
| 4,701,235 A * | 10/1987 | Mitsam | | 156/233 |
| 4,744,854 A * | 5/1988 | Schenz | | 156/498 |
| 4,758,310 A * | 7/1988 | Miller | | 162/358.5 |
| 4,781,795 A * | 11/1988 | Miller | | 162/358.5 |
| 4,802,949 A * | 2/1989 | Mitsam | | 156/540 |
| 4,859,392 A * | 8/1989 | Vetter | | 264/166 |
| 4,877,487 A * | 10/1989 | Miller | | 162/360.3 |
| 4,877,595 A * | 10/1989 | Klingle et al. | | 423/335 |
| 4,885,317 A * | 12/1989 | Thein et al. | | 521/149 |
| 4,932,855 A * | 6/1990 | Gersbeck et al. | | 425/193 |
| 5,035,764 A | 7/1991 | Blake | | |
| 5,118,274 A * | 6/1992 | Morikawa et al. | | 425/140 |
| 5,154,941 A * | 10/1992 | Hayashi | | 426/496 |
| 5,167,978 A * | 12/1992 | Gersbeck | | 425/373 |
| 5,204,037 A * | 4/1993 | Fujii | | 264/171.23 |
| 5,204,123 A * | 4/1993 | Hayashi | | 425/141 |
| 5,223,071 A * | 6/1993 | Gersbeck | | 156/358 |
| 5,242,720 A | 9/1993 | Blake | | |
| 5,314,322 A * | 5/1994 | Morikawa et al. | | 425/142 |
| 5,427,515 A * | 6/1995 | Muller et al. | | 425/96 |
| 5,580,588 A * | 12/1996 | Greene et al. | | 425/373 |
| 5,658,514 A * | 8/1997 | Fujii et al. | | 264/210.2 |
| 5,674,442 A * | 10/1997 | Morita | | 264/178 R |
| 5,733,583 A * | 3/1998 | Muller | | 425/145 |
| 5,733,589 A * | 3/1998 | Oki | | 425/364 R |
| 5,783,218 A * | 7/1998 | Morikawa | | 425/101 |
| 5,792,306 A * | 8/1998 | Verbeiren | | 156/358 |
| 5,843,510 A * | 12/1998 | Hayashi | | 426/502 |
| 5,958,309 A * | 9/1999 | Fujii et al. | | 264/1.6 |
| 6,203,307 B1 * | 3/2001 | Neider et al. | | 425/362 |
| 6,244,176 B1 | 6/2001 | Sonobe et al. | | |
| 6,257,861 B1 * | 7/2001 | Morikawa | | 425/363 |
| 6,306,327 B1 * | 10/2001 | Fujii et al. | | 264/210.2 |
| 6,360,803 B1 * | 3/2002 | d'Hondt | | 156/499 |
| 6,368,097 B1 * | 4/2002 | Miller et al. | | 425/367 |
| RE38,495 E * | 4/2004 | Fujii et al. | | 264/1.6 |
| 7,205,017 B2 * | 4/2007 | Hayashi et al. | | 426/502 |
| 7,427,372 B2 * | 9/2008 | Morita | | 264/210.2 |

* cited by examiner

MATERIAL LAYERING DEVICE

CROSS-REFERENCE TO RELATED APPLICATIONS

This invention claims priority, under 35 U.S.C. §120, to the U.S. Provisional Patent Application No. 60/868,645 to Carlston filed on Dec. 5, 2006, which is incorporated by reference herein.

BACKGROUND OF THE INVENTION

1. Field of the Invention

The present invention relates to layering devices, systems and methods, specifically to devices, systems and methods for applying layers to substrates using belts and rollers.

2. Description of the Related Art

In the related art, it has been known to use wrapping equipment to apply layers of materials to a substrate. Traditional composite tube wrapping processes are typically very labor intensive. Traditional methods require a manual application of a tacky substance on a heated mandrel; typically this tacky substance is non-supported adhesive which is ironed onto the mandrel. After the application of the tacky substance, the composite material is manually and smoothly applied to the sticky mandrel. The composite material has to be free of any wrinkles as it applied to the mandrel. Subsequent to these two steps the mandrel with the composite material is placed on a device that rolls the composite material around the mandrel. Some improvements have been made in the field. Examples of references related to the present invention are described below, and the supported teachings of each reference are incorporated by reference herein:

U.S. Pat. No. 1,393,768, issued to Feifer, discloses a wrapping machine comprising a pair of yieldingly separable rolls normally maintained close together; an endless belt with a bight normally running free and slack over said rolls, so that it may be depressed between them by an article to be wrapped to form a loop about the article, and a bight normally hanging slack from them; and driving means for said belt engaging said latter bight.

U.S. Pat. No. 657,028, issued to Pace, discloses a cotton compress, a pair of relatively fixed and moveable compression-rolls, said moveable compression-rolls having sliding supports, means for exerting a downward tension on the moveable compression-rolls, a revoluble core-rod interposed between the said rolls and regularly tapered from one end toward the other and adapted to be withdrawn from the completed bale through one side of the machine before said bale is removed, and a drive shaft having an interlocking connection with the said core-rod and also moveable in unison with the latter in a vertical direction.

U.S. Pat. No. 32,993, issued to Heald, discloses running a belt in the form of a loop, whereby a single belt encloses and forms a bearing for the whole outside surface of the cigar, with the exception of a sufficient space to admit the wrapper, the whole being constructed and operated in the manner and for the purpose set forth.

U.S. Pat. No. 1,619,615, issued to Heinrichs, discloses a machine of the class described, the combination of means for continuously folding a web of paper into the form of a flattened tube, means for securing the overlapping edges of said flattened tube together, means for cutting said flattened tube into lengths, and means for perforating said lengths transversely to form separation lines.

U.S. Pat. No. 1,070,818, issued to Lacroix, discloses a cigar machine, the combination with wrapper applying mechanism, of a traveling apron constituting a wrapper-feeder or presenting means, have perforations therein, rollers around which said apron passed, teeth on one said rollers adapted to fit within the perforations in said apron, and means for imparting a variable speed rotation to said rollers.

U.S. Pat. No. 1,057,193, issued to Wertheimer, discloses a combination with a stationary work-bed, of a flexible strip supported by the work-bed and having its ends rigidly secured at opposite ends of the work-bed and extending over the work-bed on which latter the wrapper and the article to be wrapped may be laid and means for forming a loop in the strip to embrace the wrapper and article and moving the loop over the work-bed to roll the wrapper and article along the work-bed.

U.S. Pat. No. 2,694,661, issued to Meyer, discloses a method of forming a rod which comprises continuously and progressively combining a plurality of longitudinally extending fibers and an adhesive material capable of being hardened into an elongated rod-like mass within an elongated embracing molding material having a smooth continuous molding surface contacting the rod-like mass capable of being disintegrated by heat so that when the adhesive does harden there will be a smooth continuous surface free of ridges, treating the rod-like mass to harden the adhesive, and heating the enclosed rod-like mass to disintegrate the molding material.

U.S. Pat. No. 481,453, issued to Winget, discloses a cigar-bunch-rolling machine, a rotating drum, a laterally-adjustable frame having a bunching-roller in its free end, and endless apron which passes around the drum and the said roller, and a shaping-thimble at one end of the drum, all combined substantially as specified.

U.S. Pat. No. 5,242,720, issued to Blake, discloses An overlay of sheet material that is impregnated with thermosetting resin—typically a fabric of a type including metallic, synthetic fiber, natural fiber and ceramic cloths impregnated with epoxy resin—is wrapped about or laid on an underlay of material that is also impregnated with thermosetting resin—typically a resin material reinforced with fibers of the graphite, glass, aramid, or ceramic types. The overlay and underlay are cured under heat and pressure in an oven at the same time, causing cohesive bonding of the resin within each. The resin exudes through the fabric overlay during curing and forms a hard transparent shell of cured resin to the composite article. The embedded sheet material selectively imparts color, pattern, texture, reflectivity, penetration resistance, tensile strength, thermal and electrical conductivity, and other visual and mechanical properties to the composite article as desired. Exemplary configurations include lustrous metallic-coated cloths upon the surfaces of graphite golf club shafts or vaulting poles or sailboat masts, and electrically conductive cloths conducting electricity upon the surfaces of fiber-reinforced aircraft panels.

U.S. Pat. No. 5,035,764, issued to Blake, discloses An overlay of sheet material that is impregnated with thermosetting resin—typically a fabric of a type including metallic, synthetic fiber, natural fiber and ceramic cloths impregnated with epoxy resin—is wrapped about or laid on an underlay of material that is also impregnated with thermosetting resin—typically a resin material reinforced with fibers of the graphite, glass, aramid, or ceramic types. The overlay and underlay are cured under heat and pressure in an oven at the same time, causing cohesive bonding of the resin within each. The resin exudes through the fabric overlay during curing and forms a hard transparent shell of cured resin to the composite article. The embedded sheet material selectively imparts color, pattern, texture, reflectivity, penetration resistance, tensile strength, thermal and electrical conductivity, and other visual and mechanical properties to the composite article as desired. Exemplary configurations include lustrous metallic-coated cloths upon the surfaces of graphite golf club shafts or vaulting poles or sailboat masts, and electrically conductive cloths conducting electricity upon the surfaces of fiber-reinforced aircraft panels.

U.S. Pat. No. 4,489,949, issued to Taylor et al., discloses The invention teaches an improved arrow construction which, by the partial or complete elimination of tail feathers as a means for stabilizing flight trajectory, improves both the speed and the accuracy of the arrow. A resilient stabilizing tail is substituted for tail feathers which substantially eliminates aerodynamic drag. In addition, the invention contemplates the use of a "shock piston" within the interior of the arrow shaft which serves to increase arrow penetration in the target by striking the arrow head after the initial target impact.

U.S. Pat. No. 6,244,176, issued to Sonobe et al., discloses Disclosed is a printing apparatus comprising a driving roll, a supporting roll, an endless offset blanket stretched between the driving roll and the supporting roll, a plurality of plate cylinders for transferring inks having a plurality of different colors onto the endless offset blanket, a plurality of first impression drums arranged to have the endless offset blanket held between the first impression drums and the plate cylinders, ink supply means for supplying the inks of the plural colors to the plate cylinders, and a second impression drum positioned to push the supporting roll and to have a printing medium held between the supporting roll and the second impression drum, the inks of the plural colors transferred onto the endless offset blanket being printed on the printing medium in a single operation.

U.S. Pat. No. 1,043,108, issued to Hughes, discloses an invention to improve the type inking devices of such machines and to substitute for making for the inking rolls and pads generally employed, an inking ribbon of the kind used on type writers.

U.S. Pat. No. 522,197, issued to Crowell, discloses a method of and machine for wrapping newspapers.

U.S. Pat. No. 724,485, issued to Miles, discloses a package wrapping machine.

U.S. Pat. No. 244,559, issued to Crowell, discloses a newspaper wrapping and addressing machine.

U.S. Pat. No. 237,117, issued to Mann, discloses a machine for wrapping cigars.

U.S. Pat. No. 775,538, issued to McConnell, discloses an apparatus for making non-conducting coverings.

The inventions heretofore known suffer from a number of disadvantages which include being expensive, inefficient, slow, limited in application, unreliable, prone to induce defects in layering, awkward and difficult to use.

What is needed is a device, system and/or method that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available composite material layering devices. Accordingly, the present invention has been developed to provide an efficient and consistently reproducible result for a material layering device, system and/or method.

A material layering device which may be configured to attach a sheet about an intended substrate which may include a first pinning roller. The device may also include a second pinning roller which may be disposed near the first pinning roller and may be oriented substantially parallel thereto. The second pinning roller may also be larger than the first pinning roller. The first and second pinning rollers may be distanced less than a diameter of the intended substrate. A third pinning roller that may be disposed near the first pinning roller and near the second pinning roller, wherein the third pinning roller may be positioned to apply pressure to the belt against the intended substrate when the device is in use. The third pinning roller may also compress the intended substrate against the second pinning roller.

The material layering device may further include a return system which may be disposed near the first pinning roller and the second pinning roller. The return system may include a plurality of rollers. The plurality of rollers of the return system may include three rollers. The plurality of rollers may be disposed about the first pinning roller and the second pinning roller. The return system may also include forming a virtual polygon encompassing both the first pinning roller and the second pinning roller. The device may also include a second portion that may be disposed about the return system and which may be coupled to the first loop portion. The second portion may wrap about the second pinning roller greater than about a 90 degree arc.

The material layering device may also include a belt, wherein the belt may be a complete circuit. The belt may include a first loop portion which may be disposed between and protruding beyond the first pinning roller and the second pinning roller. The first loop portion may wrap about an intended substrate along an arc greater than about 180 degrees. The first loop portion may also wrap about an intended substrate along an arc greater than about 300 degrees. The first loop portion may further wrap about an intended substrate along an arc greater than about 320 degrees The device also includes a feed portion which may be coupled to the first loop and extending outwardly from the second pinning roller opposite the first loop. The feed portion may provide a surface upon which a sheet may be placed. The device may further include an adjustment mechanism, wherein the adjustment mechanism may be coupled to one of the first pinning roller, second pinning roller and the return system. The adjustment mechanism may enable selective loosening of the belt, to release and couple a substrate from the device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not therefore to be considered to be limiting of its scope, the invention will be described and explained with additional specificity and detail through the use of the accompanying drawing(s), in which.

DETAILED DESCRIPTION OF THE INVENTION

Figure 1:
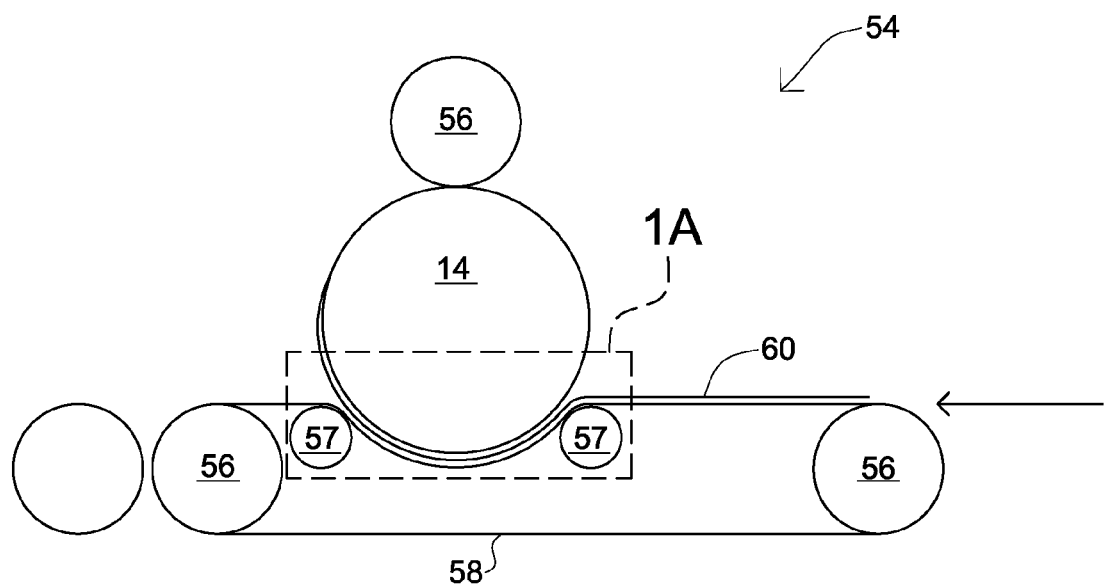
FIG. 1 is a cross-sectional side view of a layering device, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment or example is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Figure 1A:
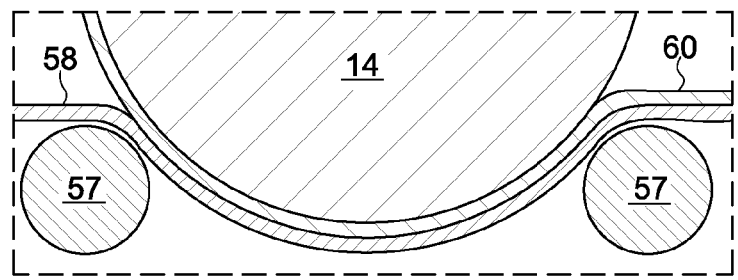
FIG. 1a is a cross-sectional side view of a layering device, according to one embodiment of the invention.

FIG. 1 and FIG. 1a illustrate a material layering device 54, according to one embodiment of the invention. The device includes a plurality of rollers 56 and a belt 58. The plurality of rollers include two pinning rollers 57 configured to be parallel to one another. The device attaches a material 60 about a substrate 14 as illustrated. The material 60 is disposed about the belt 58 and is configured to attach to the substrate 14 by rolling the material 60 around the substrate 14 in a tension environment. The illustrated device's 54 contact points between the substrate 14 and the two pinning rollers 57, is about 100 degrees around the substrate 14. FIG. 1a further illustrates a close up illustration of the device 54 and the contact points between the rollers 56, the material 60, and the substrate 14.

Figure 2:
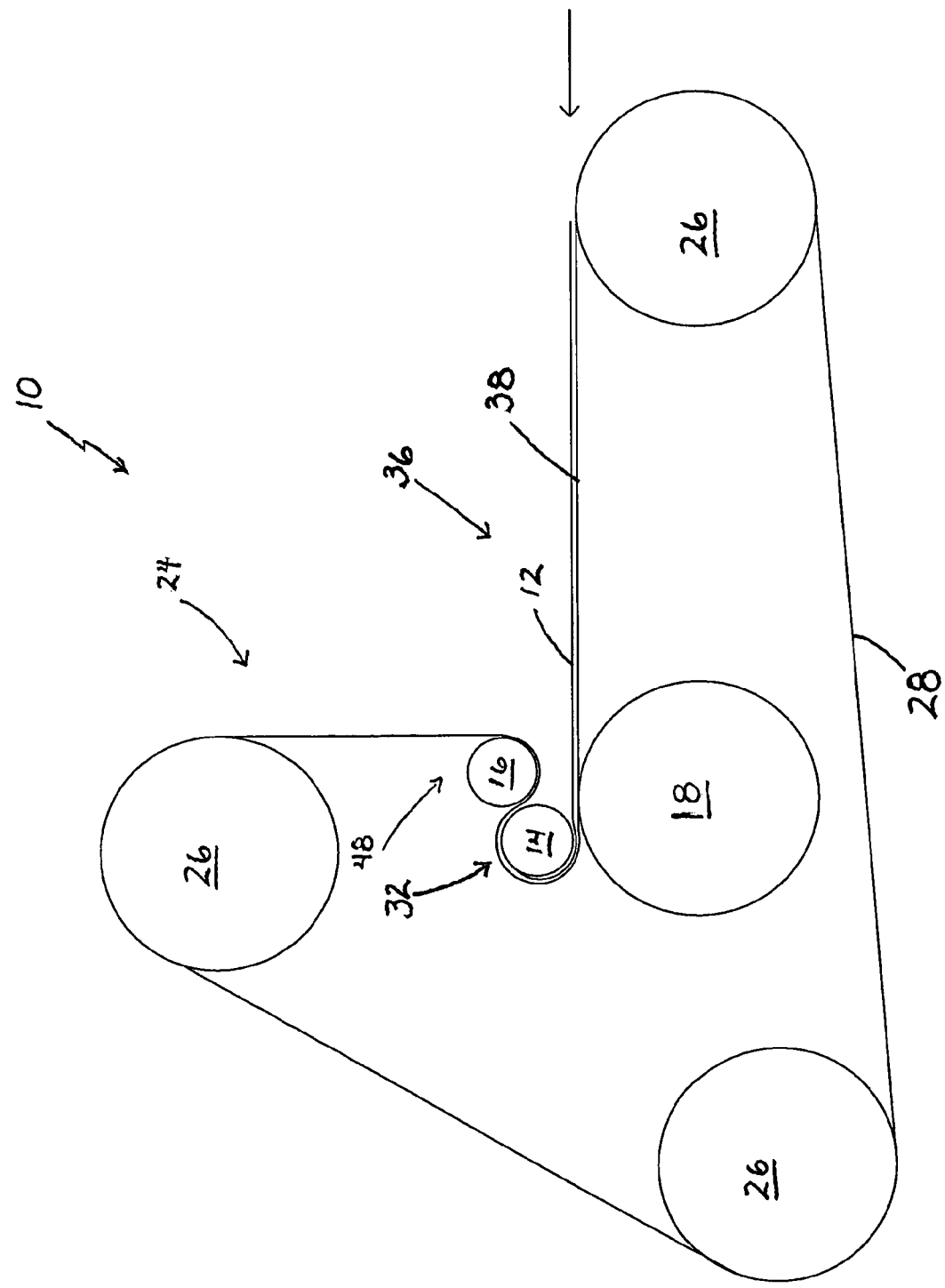
FIG. 2 is a side view of a material layering device, according to one embodiment of the invention.

FIG. 2 illustrates a material layering device 10 configured to attach a sheet 12 about a substrate 14. The sheet 12 may be any configuration and/or shape of a layering material including but not limited to flat planes, dots, ornate line art, and the like. The substrate 14 may be any material suitable for use as a substrate 14 such that it may be placed in the device 10 and a layer may be applied thereto. Typical substrate materials include but are not limited to elongated cylindrical objects such as but not limited to arrow shafts and other mandrels.

The material layering device 10 includes a first pinning roller 16 and a second pinning roller 18 disposed near the first pinning roller 16 and oriented substantially parallel thereto. The illustrated rollers 16, 18 are elongated cylinders configured to rotate about an axis, freely, under power, under friction, or any combination thereof. Accordingly, the rollers 16, 18 may be rotated as desired in the operation of the illustrated device.

The device 10 also includes a return system 24 disposed near the first pinning roller 16 and the second pinning roller 18. The illustrated return system 24 configured to permit repeatable operation of the device 10 by providing structure through which the device 10 may cycle through a layering procedure. This may be done through a continuous rotation cycle, through steps rotations, through forward-reverse cycles, and any combinations thereof.

The illustrated return system 24 includes a plurality of rollers 26 disposed about the first pinning roller 16 and the second pinning roller 18 and forming a virtual polygon encompassing both the first pinning roller 16 and the second pinning roller 18. In the illustrated case, the virtual polygon is a triangle formed enclosing the first and second pinning rollers 16 and 18. The illustrated plurality of rollers 26 consists of three rollers 26.

The illustrated device also includes a belt 28. The illustrated belt 28 is a hollow cylindrical flexible material wrapped about the rollers as shown and subject to a desired tension. The illustrated belt 28 is a complete circuit.

The illustrated belt 28 includes a first loop portion 32 disposed between and protruding beyond the first pinning roller 16 and the second pinning roller 18. The illustrated belt 28 further includes a feed portion 36 coupled to the first loop 32 and extending outwardly from the second pinning roller 18 opposite the first loop 32 and providing a surface 38 upon which a sheet 12 can be placed. In addition, a second portion 48 disposed about the return system 24 and coupled to the first loop portion 32, wherein the second portion 48 wraps about the first pinning roller 16 greater than about a 90 degree arc.

It is understood that during operation of the illustrated device 10, the physical portions of the belt 28 change names and operation, as the belt 28 is rotated, to match the position and function of such positions at any given time.

Figure 3:
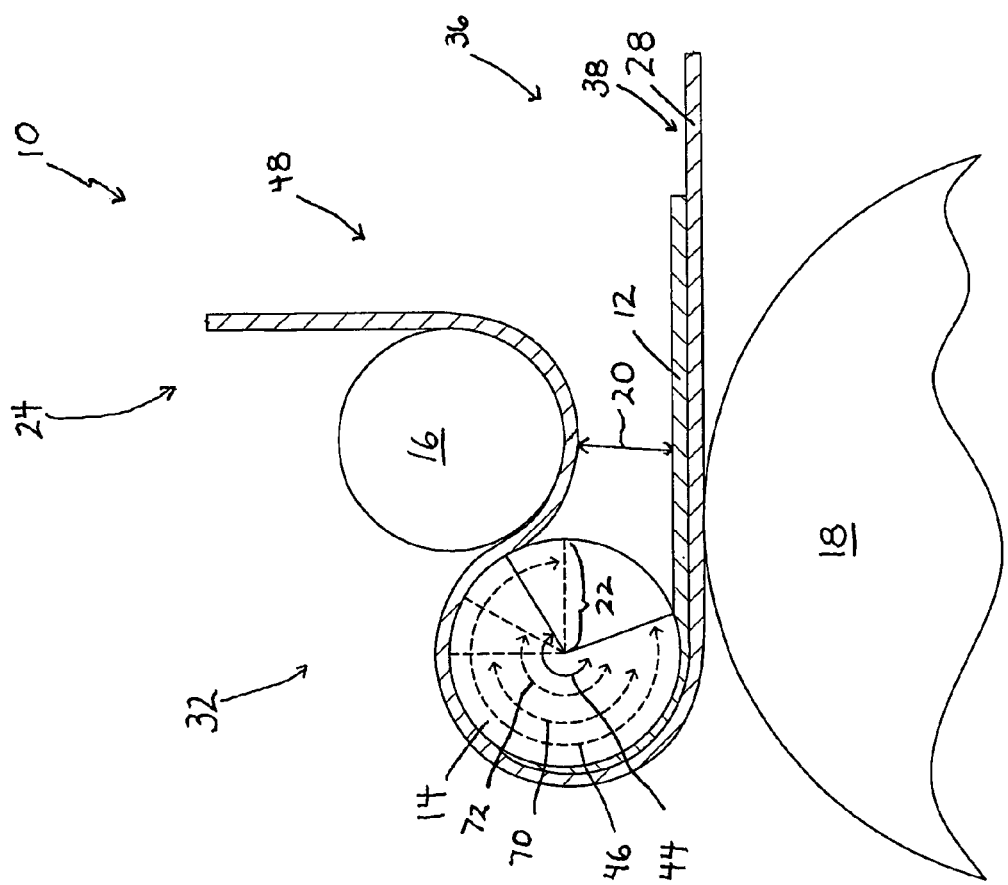
FIG. 3 is a cross-sectional side view of a material layering device, according to one embodiment of the invention.

FIG. 3 is a cross-sectional side view of a material layering device 10 configured to attach a sheet 12 about a substrate 14. The material layering device 10 includes a first pinning roller 16 and a second pinning roller 18 disposed near the first pinning roller 16 and oriented substantially parallel thereto. The first pinning roller 16 and the second pinning roller 18 include a distance 20 between the first pinning roller 16 and the second pinning roller 18 which is less than a diameter of an intended substrate (two times the radius 22). Accordingly, when a substrate 14 is disposed within the loop of the belt and the belt 28 is placed under tension, the substrate 14 is pinned against and/or between the first and second pinning rollers 16, 18. As such, the substrate 14 is subject to radial pressure along a substantially greater arc than that of prior art devices.

The illustrated second pinning roller 18 is larger than the illustrated first pinning roller 16. This advantageously reduces a total area occupied by the device 10 and allows for a return system 24 configuration as shown.

The illustrated device 10 also includes a belt 28, wherein the belt 28 has a first loop portion 32 disposed between and protruding beyond the first pinning roller 16 and the second pinning roller 18, wherein the first loop portion 32 wraps about an intended substrate 14 along an arc greater than about 300 degrees 44 and wherein the first loop portion 32 wraps about an intended substrate 14 along an arc greater than about 320 degrees 46. The material layering device 10 further includes a feed portion 36 coupled to the first loop 32 and extending outwardly from the second pinning roller 18 opposite the first loop 32 and providing a surface 38 upon which a sheet 12 can be placed. In addition, a second portion 48 disposed about the return system 24 and coupled to the first loop portion 32, wherein the second portion 48 wraps about the first pinning roller 16 greater than about a 90 degree arc.

The illustrated substrate 14 is held within the belt and pinned in place such that tension from the belt is applied over a substantially greater arc 44 than that of the prior art. A variety of arc lengths 46, 70, and 72. Wherein a distance 20 between the two pinning rollers is less than a diameter (two times the radius 22), the arc length will be greater than about 180 degrees or half the circumference of the substrate. Further, under tension, the substrate object will not be permitted to traverse the pinning rollers 16, 18 and therefore tension may be maintained. It is understood that as the distance 20 between pinning rollers 16, 18 approaches the diameter of the intended substrate 14 there may be a point wherein natural flexibility in one or more portions of the device may permit the substrate to traverse the pinning rollers 16, 18. Accordingly, one skilled in the art would be able to without undue experimentation, tune the device to appropriate settings, should an arc length of about 180 degrees be desired.

Figure 4:
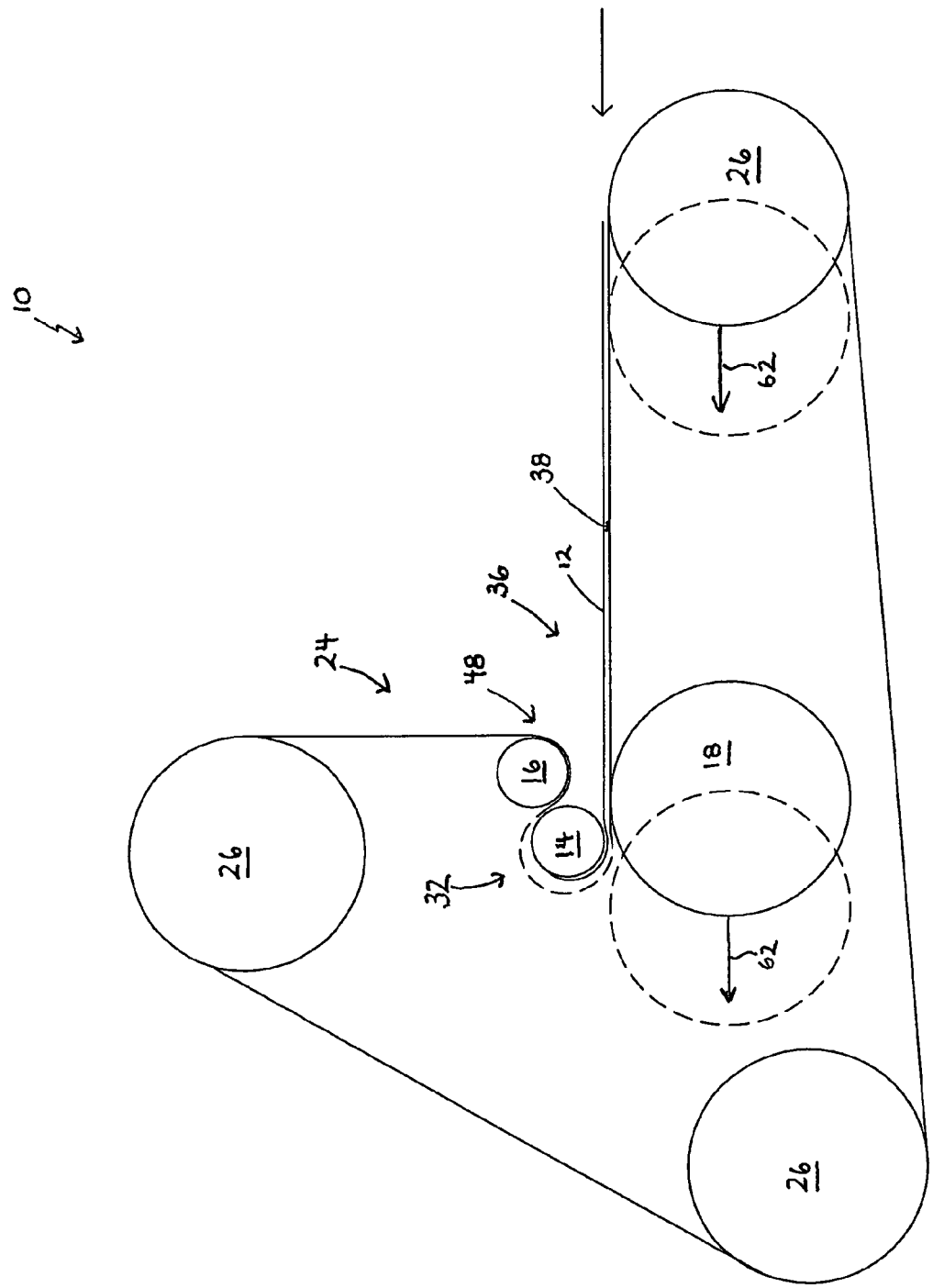
FIG. 4 is a side view of a material layering device, according to one embodiment of the invention.

FIG. 4 illustrates a material layering device 10 configured to attach a sheet 12 about a substrate 14. The material layering device 10 includes a first pinning roller 16 and a second pinning roller 18 disposed near the first pinning roller 16 and oriented substantially parallel thereto. The second pinning roller 18 is larger than the first pinning roller 16. The device 10 also includes a return system 24 disposed near the first pinning roller 16 and the second pinning roller 18, wherein the return system 24 comprises a plurality of rollers 26 disposed about the first pinning roller 16 and the second pinning roller 18 and forming a virtual polygon encompassing both the first pinning roller 16 and the second pinning roller 18, wherein the plurality of rollers 26 consists of three rollers 26. The device also includes a belt 28, wherein the belt 28 is a complete circuit, having a first loop portion 32 disposed between and protruding beyond the first pinning roller 16 and the second pinning roller 18. The material layering device 10 further includes a feed portion 36 coupled to the first loop 32 and extending outwardly from the second pinning roller 18 opposite the first loop 32 and providing a surface 38 upon which a sheet 12 can be placed. In addition, a second portion 48 disposed about the return system 24 and coupled to the first loop portion 32, wherein the second portion 48 wraps about the first pinning roller 16 greater than about a 90 degree arc.

The illustrated device 10 also includes an adjustment mechanism coupled to one of the first pinning roller 16, second pinning roller 18, and the return system 24, wherein the adjustment mechanism enables selective loosening of the belt 28. The adjustment mechanism includes a lateral translation mechanism 62 for laterally adjusting a position of one of the plurality of rollers 18, 26 of the return system 24. Such may include release latches and tracks coupled to one or more rollers or other devices configured to permit the release of tension on the belt.

Figure 5:
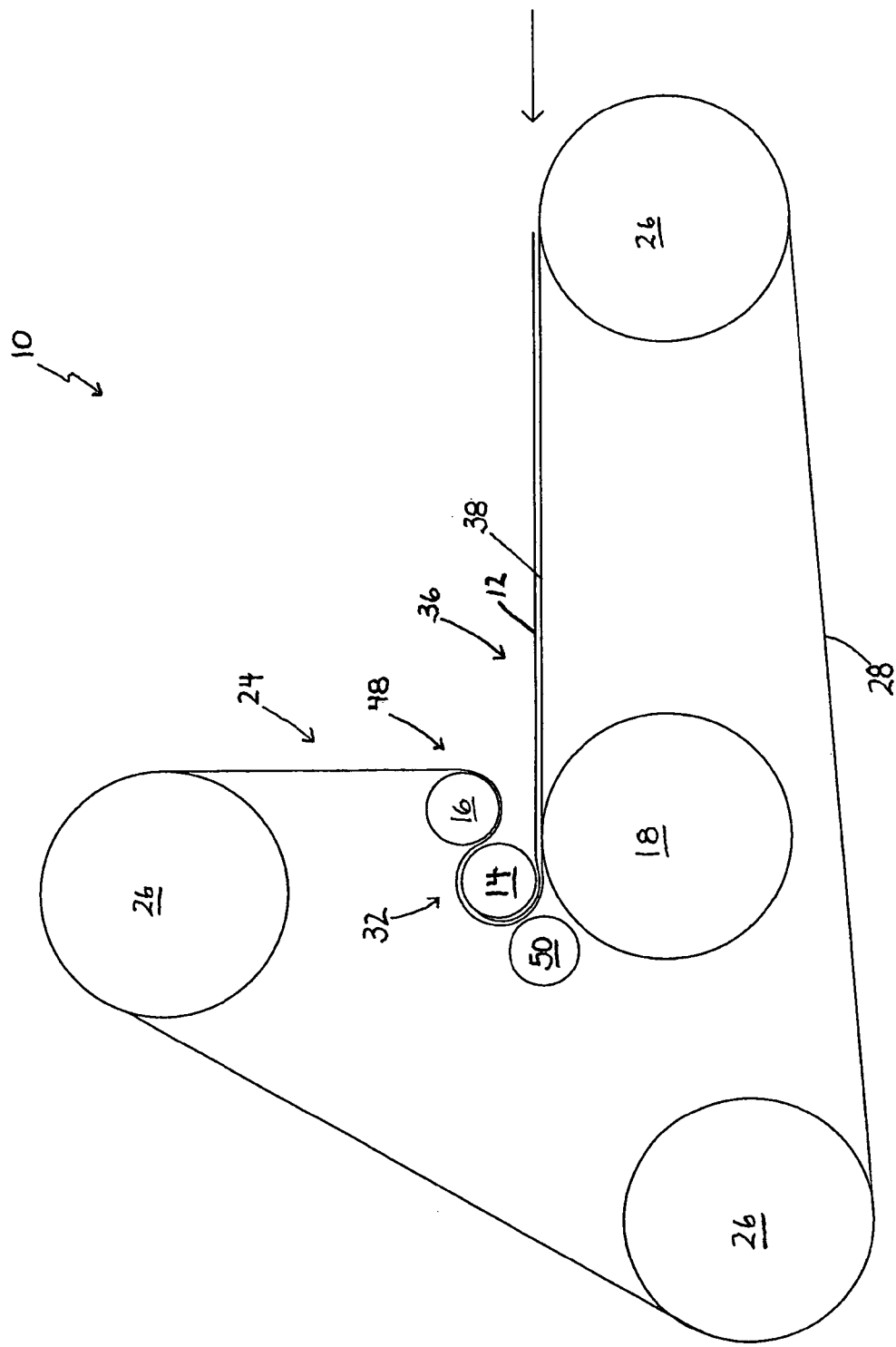
FIG. 5 is a side view of a material layering device, according to one embodiment of the invention.

FIG. 5 illustrates a material layering device 10 configured to attach a sheet 12 about a substrate 14. The material layering device 10 includes a first pinning roller 16 and a second pinning roller 18 disposed near the first pinning roller 16 and oriented substantially parallel thereto. The second pinning roller 18 is larger than the first pinning roller 16. The device 10 also includes a return system 24 disposed near the first pinning roller 16 and the second pinning roller 18, wherein the return system 24 comprises a plurality of rollers 26 disposed about the first pinning roller 16 and the second pinning roller 18 and forming a virtual polygon encompassing both the first pinning roller 16 and the second pinning roller 18, wherein the plurality of rollers 26 consists of three rollers 26. The device also includes a belt 28, wherein the belt 28 is a complete circuit, having a first loop portion 32 disposed between and protruding beyond the first pinning roller 16 and the second pinning roller 18. The material layering device 10 further includes a feed portion 36 coupled to the first loop 32 and extending outwardly from the second pinning roller 18 opposite the first loop 32 and providing a surface 38 upon which a sheet 12 can be placed. In addition, a second portion 48 disposed about the return system 24 and coupled to the first loop portion 32, wherein the second portion 48 wraps about the first pinning roller 16 greater than about a 90 degree arc.

The illustrated material layering device also includes a third pinning roller 50 disposed near the first pinning roller 16 and near the second pinning roller 18 and positioned to apply pressure to the belt 28 against a substrate 14 when the device 10 is in use. The third pinning roller 50 compresses an intended substrate 14 against the second pinning roller 18. Advantageously, the third pinning roller 50 provides additional pressure against the belt and therethrough against the substrate.

In one embodiment, the third pinning roller is adjustable in position, rotation freedom, and/or tension thereby enabling an operator to fine-tune pressure conditions during use. Such may advantageously permit an operator to handle variations in operating conditions such as but not limited to: variations in the shape, size, constituency, or other properties of substrates and/or sheets (or layering materials); variations in environmental conditions such as but not limited to heat, humidity, and the like; desired layering configurations; and combinations thereof.

In operation of one embodiment of the material layering device 10, a user loosens the belt 28 by adjusting the lateral translation mechanism 62 of the adjustment mechanism and couples a substrate to the first loop portion 32 in between the first and second pinning rollers 16, 18. The user then adjusts the lateral translation mechanism 62 and secures the substrate 14 within the first loop portion 32. The user then couples a sheet 12 to the surface 38 of the feed portion 36. The sheet is then attached to the substrate, wherein the substrate 14 and the pinning rollers 16, 18 are in contact at least 180 degrees. The user then adjusts the lateral translation mechanism 62 of the adjustment mechanism to release the substrate 14 from the first loop portion 32 of the device 10

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a first and second pinning rollers and a plurality of routing rollers, one skilled in the art would appreciate that the pinning rollers and routing rollers (return system) may vary in size, configuration, design, length, width, diameter, and still perform their intended functions.

Additionally, although the figures illustrate a circular substrate, one skilled in the art would appreciate that the device may include a substrate that varies in size, shape, design, configuration, length, width, diameter, and still perform its intended function.

It is also envisioned that the sheet may be but not limited to: a composite material, rubber material, metal material, metal alloy material, plastic material, carbon fiber material, and still perform its intended function.

It is expected that there could be numerous variations of the design of this invention. An example is that the belt may be a rectangular sheet instead of being cylindrical and the return system may include a pair of opposing rollers that roll the belt up during forward and backward cycles of operation.

Finally, it is envisioned that the components of the device may be constructed of a variety of materials including but not limited to metals, ceramics, composites, wood, textiles, fibers, plastics, and the like and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A material layering device configured to attach a sheet about a removable cylindrical substrate, comprising:
   a first pinning roller;
   a second pinning roller disposed proximate the first pinning roller and oriented substantially parallel thereto, wherein a distance between the first pinning roller and the second pinning roller is less than a diameter of the removable cylindrical substrate;
   a return system disposed proximate the first pinning roller and the second pinning roller, wherein the return system comprises a plurality of rollers disposed about the first pinning roller and the second pinning roller;
   a belt configured for attaching a sheet about the removable cylindrical substrate, wherein the belt is a complete circuit, the belt comprising:
      a first loop portion disposed between and protruding beyond the first pinning roller and the second pinning roller, wherein the first loop portion wraps about the cylindrical substrate along an arc greater than about 180 degrees; and
      a feed portion coupled to the first loop and extending outwardly from the second pinning roller opposite the first loop and providing a surface for placement of a sheet that is to be attached to the removable cylindrical substrate; and
   an adjustment mechanism coupled to one of the first pinning roller, second pinning roller and the return system, wherein the adjustment mechanism enables release and removal of the removable cylindrical substrate from the material layering device by selectively loosening the belt.

2. The device of claim 1, wherein the second pinning roller is larger than the first pinning roller.

3. The device of claim 1, wherein the return system includes forming a virtual polygon encompassing both the first pinning roller and the second pinning roller.

4. The device of claim 1, wherein the plurality of rollers of the return system includes three rollers.

5. The device of claim 1, wherein the first loop portion wraps about the cylindrical substrate along an arc greater than about 300 degrees.

6. The device of claim 1, wherein the first loop portion wraps about the cylindrical substrate along an arc greater than about 320 degrees.

7. The device of claim 1, wherein the device further includes a second portion that is disposed about the return system and coupled to the first loop portion.

8. The device of claim 7, wherein the second portion wraps about the first pinning roller greater than about a 90 degree arc.

9. The device of claim 1, wherein the device further includes a third pinning roller that is disposed proximate the first pinning roller and the second pinning roller and positioned to apply pressure to the belt against the cylindrical substrate when the device is in use.

10. The device of claim 9, wherein the third pinning roller compresses the cylindrical substrate against the second pinning roller.

11. The device of claim 1, wherein the adjustment mechanism includes a lateral translation mechanism for laterally adjusting a position of one of the plurality of rollers of the return system.

12. A material layering device configured to attach a sheet about a removable substrate, comprising:
   a first pinning roller;
   a second pinning roller disposed proximate the first pinning roller and oriented substantially parallel thereto, wherein a distance between the first pinning roller and the second pinning roller is less than a diameter of the removable substrate, and wherein the second pinning roller is larger than the first pinning roller;
   a return system disposed proximate the first pinning roller and the second pinning roller, wherein the return system comprises a plurality of rollers at disposed about the first pinning roller and the second pinning roller and forms a virtual polygon encompassing both the first pinning roller and the second pinning roller, and wherein the plurality of rollers of the return system includes three rollers; and a belt configured for attaching a sheet about the removable substrate, the belt comprising a first loop portion disposed between and protruding beyond the first pinning roller and the second pinning roller and wherein the first loop portion wraps about the removable substrate along an arc greater than about 180 degrees; a third pinning roller disposed proximate the first pinning roller and the second pinning roller and positioned to apply pressure to the belt against a substrate when the device is in use, and the third pinning roller compresses the removable substrate against the second pinning roller; and an adjustment mechanism is coupled to one of the first pinning roller, second pinning roller and the return system, wherein the adjustment mechanism enables release and removal of the removable substrate from the material layering device by at least partially decreasing the tension of the belt, wherein the adjustment mechanism includes a lateral translation mechanism for laterally adjusting a position of one of the plurality of rollers of the return system.

13. The device of claim 12, wherein the first loop portion wraps about the removable substrate along an arc greater than about 300 degrees.

14. The device of claim 13, wherein the first loop portion wraps about an-intended the removable substrate along an arc greater than about 320 degrees.

15. The device of claim 12, wherein the device further includes a feed portion coupled to the first loop and extending outwardly from the second pinning roller opposite the first loop and providing a surface for placement of a sheet that is to be attached to the removable substrate.

16. The device of claim 12, wherein the device further includes a second portion disposed about the return system and coupled to the first loop portion, wherein the second portion wraps about the first pinning roller greater than about a 90 degree arc.

17. A material layering device configured to attach a sheet about a removable cylindrical substrate, including:
a first pinning roller;
a second pinning roller disposed proximate the first pinning roller and oriented substantially parallel thereto, wherein a distance between the first pinning roller and the second pinning roller is less than a diameter of the removable cylindrical substrate, wherein the second pinning roller is larger than the first pinning roller;
a return system disposed proximate the first pinning roller and the second pinning roller, wherein the return system comprises a plurality of rollers disposed about the first pinning roller and the second pinning roller and forming a virtual polygon encompassing both the first pinning roller and the second pinning roller, wherein the plurality of rollers consists of three rollers;
a belt for attaching a sheet about the removable cylindrical substrate, wherein the belt is a complete circuit, comprising:
a first loop portion disposed between and protruding beyond the first pinning roller and the second pinning roller, wherein the first loop portion wraps about the cylindrical substrate along an arc greater than about 320 degrees;
a feed portion coupled to the first loop and extending outwardly from the second pinning roller opposite the first loop and providing a surface for placement of a sheet that is to be attached to the removable cylindrical substrate; and
a second portion disposed about the return system and coupled to the first loop portion, wherein the second portion wraps about the first pinning roller greater than about a 90 degree arc;
a third pinning roller disposed proximate the first pinning roller and the second pinning roller and positioned to apply pressure to the belt against a substrate when the device is in use, wherein the third pinning roller compresses the cylindrical substrate against the second pinning roller; and
an adjustment mechanism coupled to one of the first pinning roller, second pinning roller and the return system, wherein the adjustment mechanism enables removal of the removable substrate from the material layering device by selectively loosening the belt, wherein the adjustment mechanism includes a lateral translation mechanism for laterally adjusting a position of one of the plurality of rollers of the return system.

18. The device of claim 12, wherein the removable substrate comprises an arrow shaft.

19. The device of claim 12, wherein the removable substrate comprises a mandrel that is separate from the material layering device and configured to have an article produced by the material layering device formed thereon.

20. An assembly, comprising:
a removable cylindrical substrate upon which a sheet is attached to form an article; and
a material layering device, comprising:
a first pinning roller;
a second pinning roller disposed proximate the first pinning roller and oriented substantially parallel thereto, wherein a distance between the first pinning roller and the second pinning roller is less than a diameter of the removable substrate, and wherein the second pinning roller is larger than the first pinning roller;
a return system disposed proximate the first pinning roller and the second pinning roller, wherein the return system comprises a plurality of rollers at disposed about the first pinning roller and the second pinning roller and forms a virtual polygon encompassing both the first pinning roller and the second pinning roller, and wherein the plurality of rollers of the return system includes three rollers; and
a belt comprising a first loop portion disposed between and protruding beyond the first pinning roller and the second pinning roller, wherein the first loop portion, in a direction of intended travel of the belt, extends from a surface of the second pinning roller, wraps about the removable cylindrical substrate along an arc greater than about 180 degrees, and extends to an opposing surface of the second pinning roller to secure the removable cylindrical substrate therein and to attach a sheet carried by the belt to the removable cylindrical substrate; a third pinning roller disposed proximate the first pinning roller and the second pinning roller and positioned to apply pressure to the belt against a substrate when the device is in use, and the third pinning roller compresses the removable substrate against the second pinning roller; and an adjustment mechanism is coupled to one of the first pinning roller, second pinning roller and the return system, wherein the adjustment mechanism enables release and removal of the removable substrate from the material layering device by at least partially decreasing the tension of the belt, wherein the adjustment mechanism includes a lateral translation mechanism for laterally adjusting a position of one of the plurality of rollers of the return system.

* * * * *

UNITED STATES PATENT AND TRADEMARK OFFICE
CERTIFICATE OF CORRECTION

| | |
|---|---|
| PATENT NO. | : 8,221,109 B2 |
| APPLICATION NO. | : 11/951174 |
| DATED | : July 17, 2012 |
| INVENTOR(S) | : Marvin Carlston |

Page 1 of 1

It is certified that error appears in the above-identified patent and that said Letters Patent is hereby corrected as shown below:

In the claims:
CLAIM 6,    COLUMN 10,    LINE 34,    change "are" to --arc--

Signed and Sealed this
First Day of October, 2013

Teresa Stanek Rea
*Deputy Director of the United States Patent and Trademark Office*